United States Patent [19]

Foster

[11] Patent Number: 5,005,523
[45] Date of Patent: Apr. 9, 1991

[54] HATCHER WITH INTERNALLY MOUNTED EXHAUST DUCT AND EXHAUST DAMPER CONTROL MEANS

[75] Inventor: Matthew R. Foster, Cambridge, Canada

[73] Assignee: Marmon Corporation, Chicago, Ill.

[21] Appl. No.: 473,118

[22] Filed: Jan. 31, 1990

Related U.S. Application Data

[63] Continuation of Ser. No. 145,608, Jan. 19, 1988, abandoned.

[51] Int. Cl.⁵ ............................................. A01K 41/00
[52] U.S. Cl. ....................................................... 119/37
[58] Field of Search ........................ 119/35, 37, 38, 39

[56] References Cited

U.S. PATENT DOCUMENTS

| | | | |
|---|---|---|---|
| 2,107,809 | 2/1938 | Warner | 119/35 X |
| 2,984,240 | 5/1961 | Eames | 119/37 |
| 3,006,320 | 10/1961 | Bailey | 119/37 |
| 3,147,737 | 9/1964 | Theilig | 119/37 |
| 3,584,927 | 6/1971 | Ott | 119/37 X |
| 3,854,452 | 12/1974 | Bardet | 119/37 |
| 3,923,006 | 12/1975 | Dugan et al. | 119/37 |
| 3,938,472 | 2/1976 | Jauneaud | 119/37 |
| 4,183,325 | 1/1980 | Destouches et al. | 119/37 |
| 4,274,364 | 6/1981 | Forseth | 119/35 |
| 4,606,299 | 8/1986 | Grumbach | 119/37 X |
| 4,706,608 | 11/1987 | Foster | 119/37 X |

FOREIGN PATENT DOCUMENTS

| | | | |
|---|---|---|---|
| 747454 | 7/1980 | U.S.S.R. | 119/37 |
| 924217 | 9/1958 | United Kingdom | 119/39 |

Primary Examiner—Gene Mancene
Assistant Examiner—R. Thomas Price
Attorney, Agent, or Firm—Jon Carl Gealow; James M. Wetzel

[57] ABSTRACT

The present invention relates to an improved hatcher structure which is more efficient than conventional hatchers and which is easier to construct, operate and service. In particular, the hatcher of the present invention utilizes a restricted area, high pressure zone of air to control the exhaust of air from within the chamber and, in turn, control the intake of cooler external air into the chamber and the mixing of that air with the internal air. To achieve this control, the hatchet of the present invention further utilizes a mobile environmental adjustment system and an alignment mechanism which ensures precise and consistent placement of the environment adjustment system within the chamber. In addition, the present invention employs an improved frame post and doorway seal which facilitate construction, operation and maintenance and which promote internal environmental consistency.

16 Claims, 6 Drawing Sheets

HATCHER WITH INTERNALLY MOUNTED EXHAUST DUCT AND EXHAUST DAMPER CONTROL MEANS

This application is a continuation of 07/145,608, filed on 1-19-88, now abandoned.

BACKGROUND OF THE INVENTION

1. Field Of The Invention

This invention relates to an improved hatcher structure which maintains internal environmental consistency to insure efficient high yielding results from each batch of eggs. More specifically, the invention relates to a hatcher structure in which the exhausting of internal air is positively controlled to maintain temperature, humidity, and fresh air levels within the hatcher chamber at consistent, prescribed levels to promote the nurturing and maturing of poultry embryos into hatched birds.

At the present time, an increasing demand exists to feed an expanding world population. Scientific studies have confirmed the beneficial results obtained by a person consuming less red meat. One viable solution to these problems lies in the mass production of poultry or fowl as food such as chicken, turkey or duck. Integral to this solution is the ability to incubate and hatch mass quantities of eggs. While incubation and hatching systems for this purpose have been used for many years, conventional systems do not provide as consistent an environment as possible and therefore, are not as efficient and not as productive, as possible.

It is an objective of hatcheries to have all eggs in a batch develop and hatch in the same time period. To effectuate this, temperature, humidity and fresh air levels must be continually and consistently maintained. Minor deviations in the prescribed levels of these conditions can adversely effect a large percentage or even an entire batch of hatching eggs. It is not possible to wait for a batch to develop nor to hold back a batch that has passed its normal period of development and hatching time. Pulling a batch early will leave birds still in the shell and birds wet or not on their feet. Pulling a batch late will cause birds to be dehydrated. Both of these conditions will cause birds to be culled and discarded. Because a hatcher can hold over 15,000 eggs, the potential loss to the producer resulting from improper environmental conditions can be substantial. Consequently, it is imperative that the hatcher consistently maintain appropriate environmental conditions.

The internal environment of a hatcher is constantly changing. During the hatching process the gestating birds (chicks, goslings, ducklings, or other fowl) intake oxygen and produce carbon dioxide. In addition, as the advanced embryos mature and ultimately hatch, they generate more and more heat. Consequently, the oxygen in the hatching chamber must be continuously replenished, thereby introducing external air which is not at the proper heated or humidified levels, the stale air must be exhausted from the chamber and the heat as well as humidity levels must be monitored and maintained at prescribed levels. Deviation of any of the levels of heat, humidity or carbon dioxide can have severe effects on the development of the chicks.

For example, if the birds are subjected to reduced temperatures, as little as two or three degrees Fahrenheit less than the prescribed temperature, the birds may be pipped and not escaped from the shell at the end of the normal hatching period. A reduced temperature of as little as one degree will require a longer hatching time and may result in some of the birds still being wet at the time of removal of the batch from the hatching chamber. This, in turn, will cause some of the birds to be culled and discarded. In contrast, a temperature which is as little as two or three degrees Fahrenheit high will decrease the hatching period and produce birds which will have varying degrees of dehydration, heat prostration and other problems which will cause the birds to be culled and discarded.

Although it is understood that the condition of adversely high or low humidity and its effect on the embryos will already have occurred in the incubation period, prior to the hatching period, the maintaining of a predetermined humidity condition in the hatcher is important. For instance, if the humidity is kept too high the bird will remain large and have difficulty moving inside the egg and difficulty in escaping from the shell. In comparison, too much moisture loss will result in birds that are puny and dehydrated. In addition, too little moisture in the hatching chamber will cause the membrane under the shell and next to the bird to dry out and stick to the birds' down. The effected birds, if not culled and discarded, may die prior to reaching the farm or may never achieve their weight gain potential.

Fluctuation in carbon dioxide levels can be equally damaging. For instance, if the carbon dioxide levels are sufficiently more than the prescribed amount, the resulting chicks hatch from their shells deprived of oxygen and panting for air. Too high an increase over the prescribed level kills the birds.

In hatchers generally, air is introduced to the hatching chamber to replenish the oxygen supply for the embryos or emerging birds, to supplant exhausted internal air containing carbon dioxide and to allow regulation of the humidity and temperature of the internal air. In some conventional hatchers, the external air is drawn into the chamber through a slot or intake opening in the roof or possibly in the front wall of the hatcher. By maintaining the pressure inside the chamber at a lower level, or at a negative pressure with respect to the air outside the hatcher, the external air is drawn into the chamber through the intake opening. In other conventional hatchers, the air is sometimes forced into the chamber by the use of motorized blower assemblies or other mechanized drives for controlling the size of the air intake opening.

In conventional hatchers the air flow patterns of the air entering the hatching chamber are affected by the manner in which the air enters the chamber. For example, the air patterns will be altered because of the activity of the forced blower assemblies as well as a movement of damper mechanisms. Typically, the air patterns are dispersed in all directions and cause an inconsistent environment throughout the chamber. Environmental adjustment elements, such as heaters for warming the air, and sprayers for adding moisture to the air and fans or blowers for circulating the air are located within the hatcher chamber to maintain environmental consistency. However, because the external air disperses in all directions, these environmental adjustment elements are not able to sufficiently condition the incoming air to maintain the internal environment at a stable level or to immediately condition or treat all of the incoming air. The incoming external air may artificially stimulate the temperature and humidity measuring probes and thereby cause the environmental adjustment elements to react by maintaining inaccurate environmental levels or the untreated air may create adverse temperature and moisture zones which will have a damaging effect on the emerging birds.

SUMMARY OF THE INVENTION

To overcome these problems, the present invention positively controls the exhausting of internal air from the hatcher thereby also positively controlling the amount of external fresh air entering the chamber. In addition, the present invention effectively circulates, heats and humidifies the internal air and effectively mixes the newly introduced external air with conditioned and stabilized internal air before the newly introduced external air can adversely effect the emerging birds.

In addition to providing enhanced efficiency by improving environmental consistency, the hatcher structure of the present invention is designed for more efficient construction and service. The present hatcher, like conventional hatchers, is more efficient to operate and service because the heating, humidifying and air circulating elements are mounted on a movable frame or stand which is positioned in the chamber during operation and is easily removed for cleaning and service. In particular, air movement and circulation within the chamber is critical. To positively control the exhausting of internal air and simultaneously influence and control the intake of external air as well as its mixing with the internal air, the present invention creates a restricted, high pressure zone of air adjacent the exhaust openings in the hatcher chamber. An improper placement of the mounting stand and air circulating devices could not only disrupt the restricted, high pressure zone of air but could also disrupt intended air flow patterns within the chamber which would result in areas having adverse temperature and moisture levels. The hatcher of the present invention overcomes this problem and, in fact, simplifies overall construction and operation by providing a consistent alignment feature which insures optimum and precise placement of the mounting stand containing the heating, humidifying and air circulation elements without structural modifications to correct uneven flooring.

The present invention further includes improved doorway threshold seals which promote efficiency in operation and service as well as promote internal environmental consistency. The doorway seals not only prevent cooler external air from entering the hatching chamber but are designed to adapt to uneven floors. Moreover, the seals are easily positioned and removed for easy ingress and egress of egg carts and are structurally designed to allow for easy cleaning. The ability to easily clean structural components in a hatcher is a critical feature due to the large amount of fluff that is generated by the hatching chicks.

Still further structural features which facilitate construction and service are found in the door frame posts. Conventional door frame posts are typically simple rectangular posts. To attach caps to the ends or to attach other frame members to the posts first requires placing mounting brackets inside the post. The caps or other frame members are then attached to the mounting bracket. The frame post used in the present invention avoids the middle step of affixing a mounting bracket by forming a continuous boss along each internal corner of the post. Thus, caps or other frame members can be attached to the post without first having to add a mounting bracket.

OBJECTS OF THE INVENTION

It is a general object of the present invention to provide an improved hatcher structure which maintains environmental conditions inside the hatching chamber at constant optimum levels.

It is another object of the invention to provide an improved hatcher structure which controls the exhaust of internal air to maintain internal environmental consistency.

More particularly, it is an object of this invention to provide a restricted, high pressure zone of air within the chamber to control the exhausting of air from inside the hatcher chamber, to control the intake of external air and to control the mixing and circulation of external air with internal air.

It is still another object of the present invention to maintain temperature, humidity and fresh air levels within the hatcher chamber at substantially constant prescribed levels.

It is still a further object of the present invention to provide an improved hatcher structure which facilitates construction, operation and service.

More specifically, it is an object of the present invention to provide precise alignment and positioning of the environmental adjustment elements.

Other objects and advantages of the invention will become apparent upon reading the following detailed description and appended claims, and upon reference to the accompanying drawings.

BRIEF DESCRIPTION OF THE DRAWINGS

For a more complete understanding of this invention reference should now be made to the embodiments illustrated in greater detail in the accompanying drawings and described below by way of an example of the invention.

It should be understood that the drawings are not necessarily to scale. In certain instances, details which are not necessary for an understanding of the present invention or which render other details difficult to perceive may have been omitted. It should also be understood that the invention is not necessarily limited to the particular embodiments illustrated herein.

DETAILED DESCRIPTION OF THE INVENTION

Figure 1:
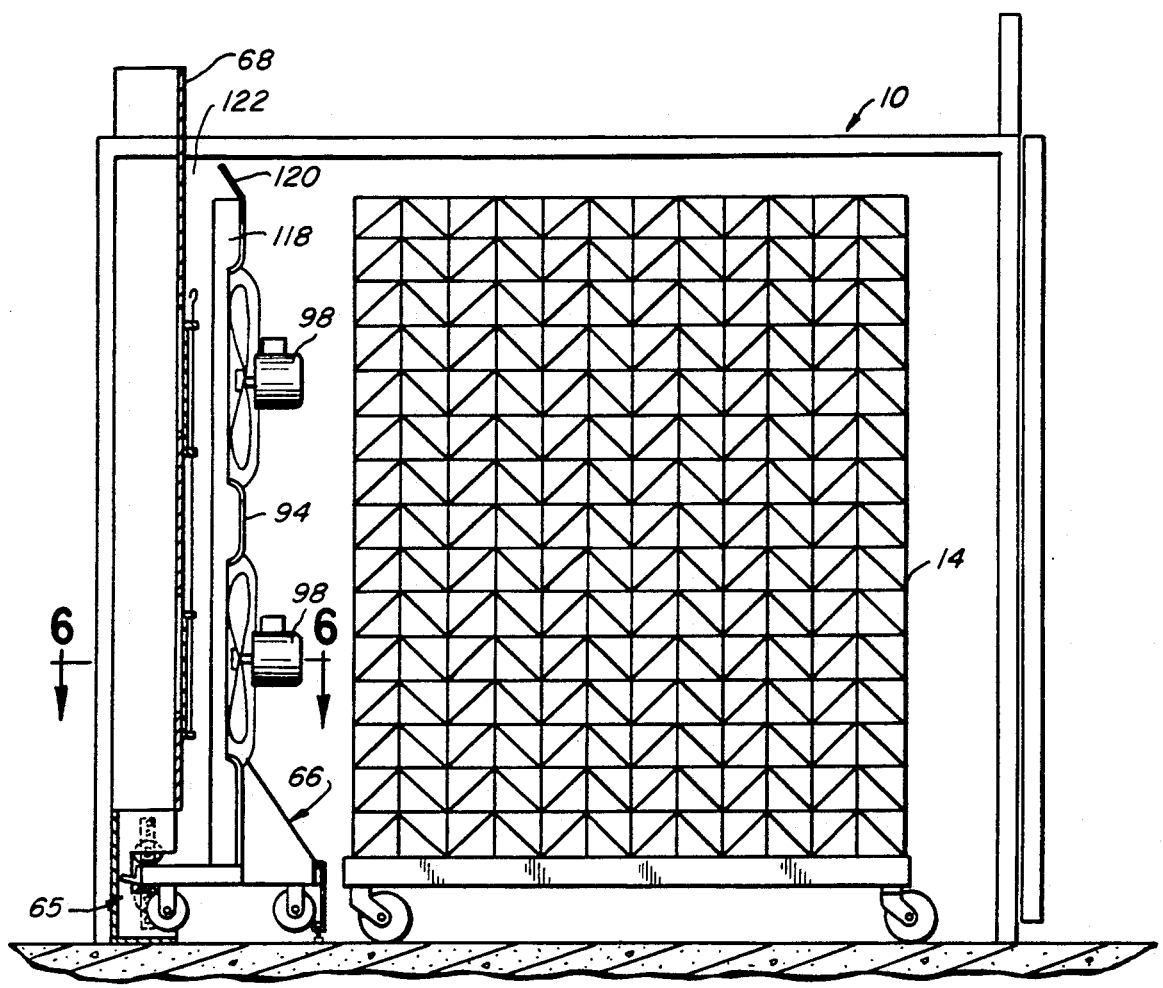
FIG. 1 is a cross-sectional side view of the hatcher of this invention.
Figure 9:
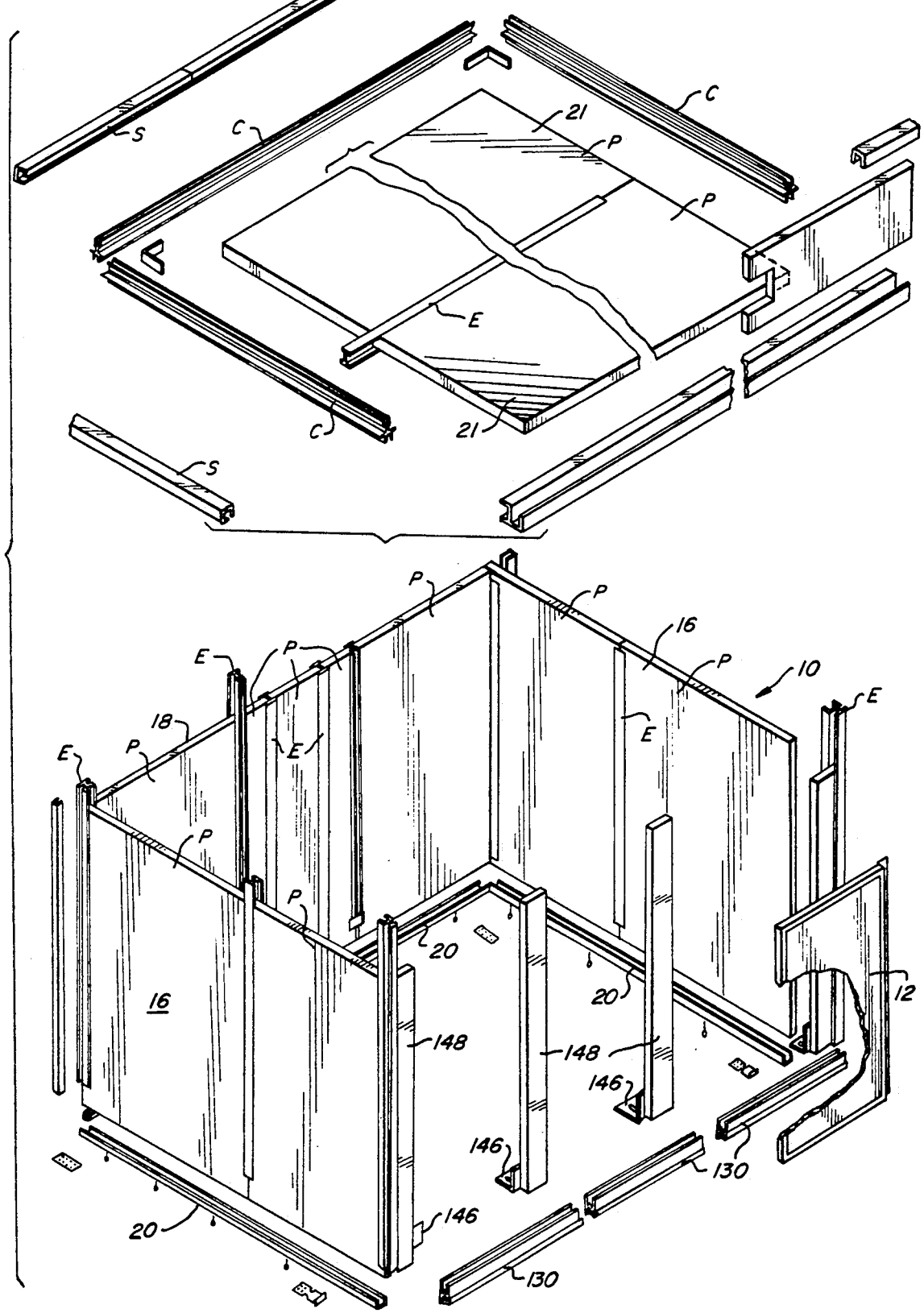
FIG. 9 is an exploded perspective view of the hatcher of this invention.

As can be seen in FIG. 9, the preferred embodiment of the hatcher 10 of the present invention is generally cubical in shape and is provided with three front doors 12 to allow ingress and egress of three trolleys or egg racks 14 (FIG. 1). A single trolley typically holds 2 columns of egg trays with fifteen trays in a column. Total capacity for each egg rack or trolley is approximately 5,000 eggs making capacity for the entire hatcher 15,000 eggs. The hatcher does not have a separate floor but utilizes the floor of the hatchery building where it is constructed. To adapt to uneven hatchery floors, the wall panels are mounted in a base channel 20 which is provided with leveling screws well known in the art (FIG. 9). Additionally, while not shown in the drawings, the floor of the hatcher may be provided with channels or guides to facilitate moving the trolleys in and out of the hatcher.

The shell of the hatcher generally comprises two side walls 16, a rear wall 18, a roof 21 as well as the three front doors 12. The walls and roof are constructed from appropriate insulated panels P joined by various extrusions E known in the art. In the preferred embodiment, at least the inside surfaces of the wall and roof panels should be constructed of a material which is scuff and stain resistant as well as easy to clean.

In addition to joining adjacent panels to form the side walls and the roof, the extrusions may be formed so that a subsequently constructed hatcher can share a common side wall with an existing hatching unit. In particular, the corner extrusions C which connect the side wall panels to the roof panels can be adapted to accommodate and support roof panels of a second hatcher constructed adjacent an existing unit. In this manner, the second unit can be constructed without incurring the material costs associated with the redundant side wall. Extrusion caps S can be utilized to enclose the exposed portion of the corner extrusions until a subsequent hatcher is constructed.

Figure 2:
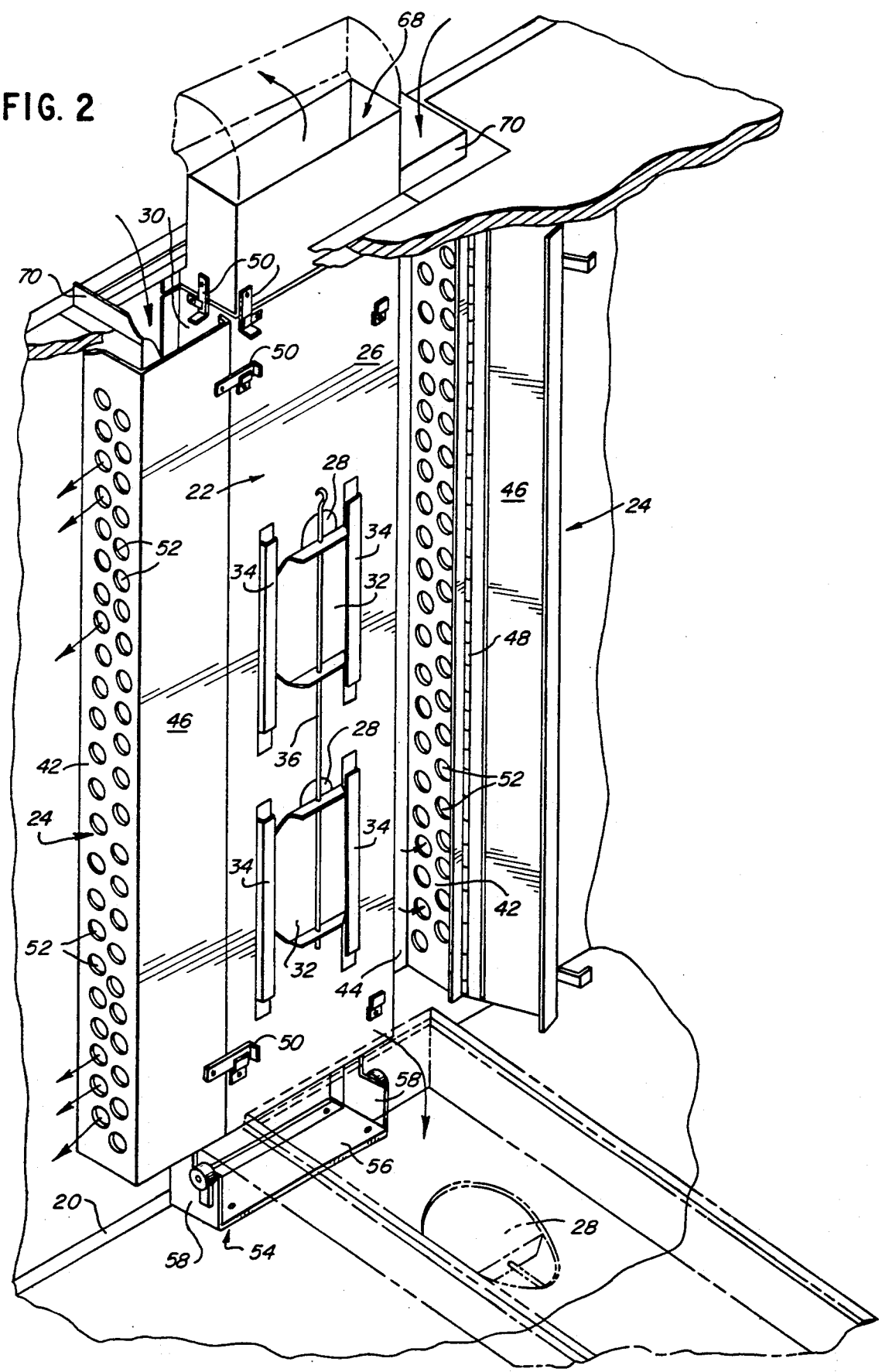
FIG. 2 is a perspective view of the support member, intake and exhaust ducts and intake and exhaust vent of this invention.

In the preferred embodiment, three air ducts are formed along the back or rear wall 18 of the hatcher (FIG. 2). The center duct is an exhaust duct 22 for removing air from the chamber and the two adjacent ducts on either side of the exhaust duct are air intake ducts 24. The exhaust duct has a front wall 26 with two openings 28 formed therein for allowing air within the chamber to be exhausted and two side walls 30. The size of the openings are automatically adjustable by moving in unison two dampers 32, slidably mounted in damper slides 34 on the face of the front wall, in response to a monitoring and control mechanism mounted on the hatcher roof.

Figure 8:
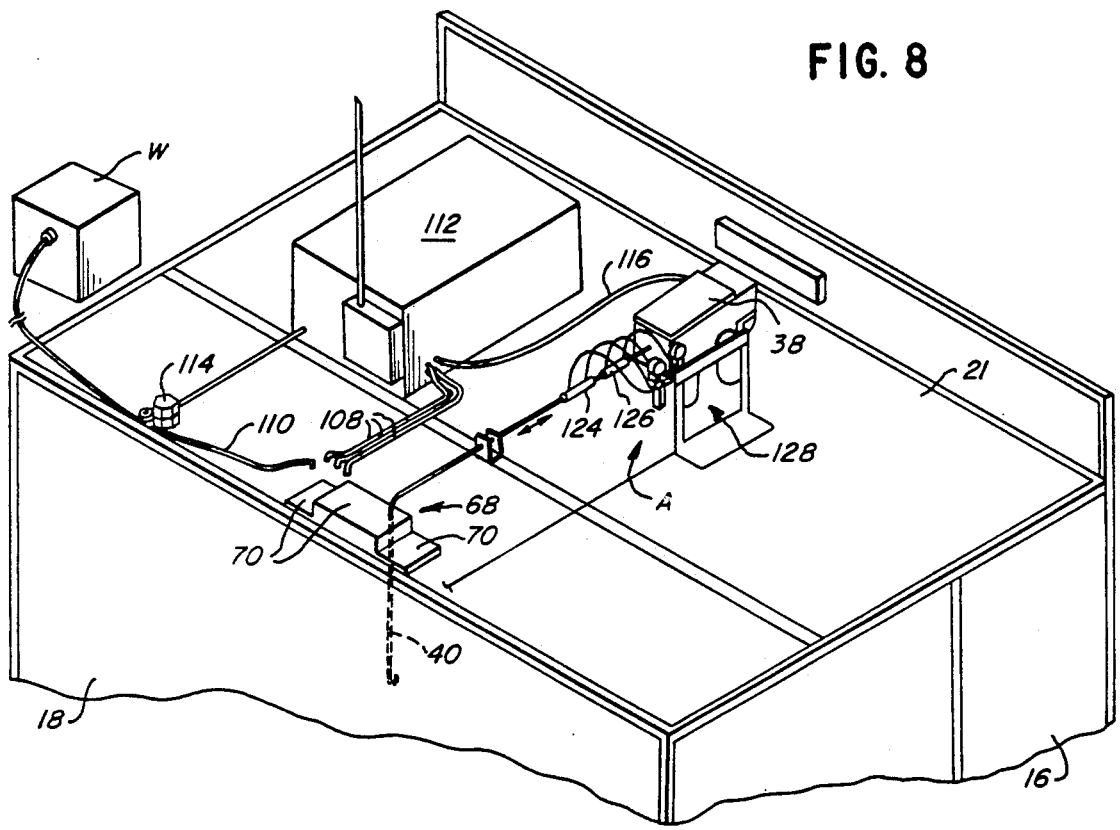
FIG. 8 is a top perspective view of the control and regulating mechanism of the present invention.

As best seen in FIGS. 2 and 8, the two dampers 32 are interconnected by a damper rod 36 which, in turn, is connected to a drive motor 38 by a cable, chain or other appropriate means 40. The drive motor 38 provides a constant linear output to move the dampers 32 up or down in constant linear motion. Non-linear response can be achieved by varying the size of the exhaust opening 28 rather than employing a complex motor with varying speeds. In the preferred embodiment, as best seen in FIG. 2, the exhaust openings gradually increase in width from top to bottom so that as the dampers are lowered the actual opening increases logarithmicly in response to the linear movement of dampers. The size or shape of the openings can be made to meet any air flow requirements.

Figure 6:
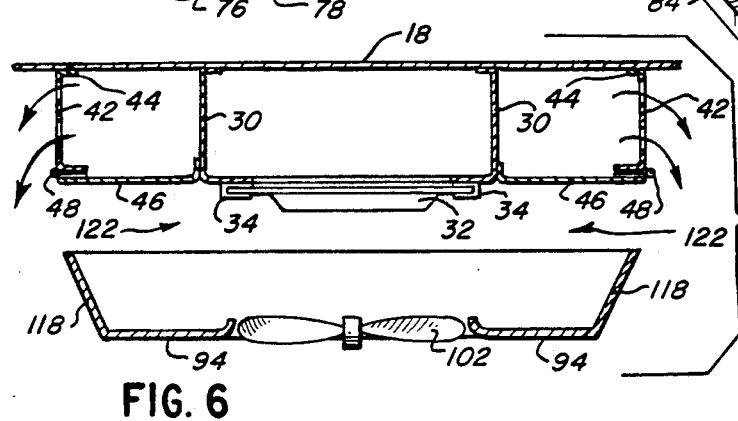
FIG. 6 is a top view of the intake and exhaust ducts taken along line 6—6 of FIG. 1 of the present invention.

The rear wall 18 of the hatcher is utilized as the back wall of the air exhaust and intake ducts and the side walls 30 of the exhaust duct are utilized as the inside walls for each of the air intake ducts 24. The air intake ducts are further comprised of a second side wall 42, affixed to the rear panels of the chamber by an integral flange 44, (FIG. 6) and a front wall 46 connected to the side wall 42 by multiple hinges 48 to allow the front wall to swing away from the exhaust duct for cleaning. As is seen in FIG. 2, the front wall 46 of the air intake ducts are locked in position by locking members 50 well known in the art. In addition, the second or outside side walls 42 of the air intake ducts are provided with a plurality of openings 52 to allow external air to enter the hatching chamber. The size, shape and number of openings are dependent upon the air circulation requirements which is contingent upon the type of air circulation being used in the hatcher.

Figure 3:
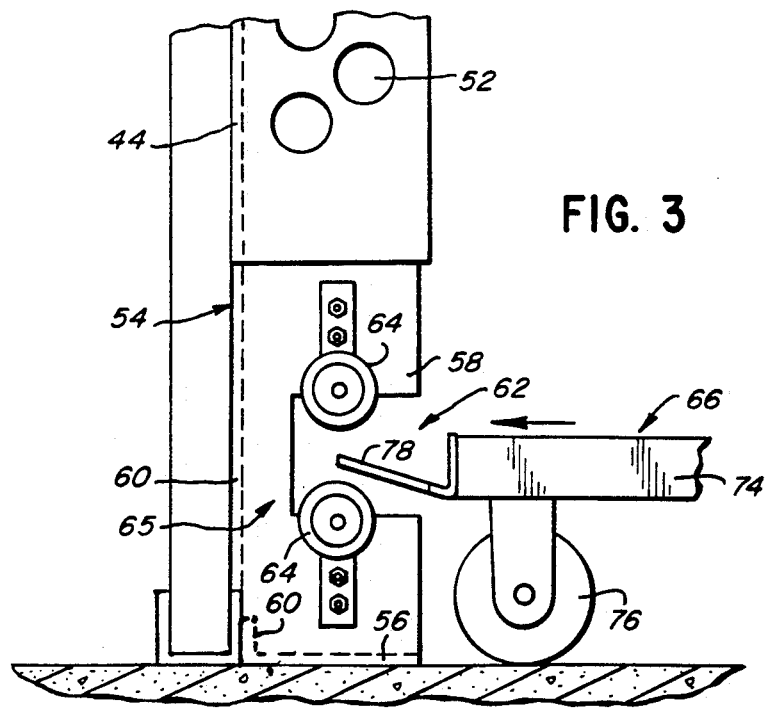
FIG. 3 is a side view of the support member and alignment means prior to engaging the mobile stand of the present invention.

A support member 54, shown in FIGS. 2 and 3, supports the exhaust duct 22 and properly aligns the exhaust duct for efficient air flow. The support member 54 is affixed to the base channel 20 of the hatcher. The base channel rests on the floor and provides the appropriate seating for the wall panels. By affixing the support member to the base channel, the support member is consistently positioned in every hatcher.

The support member 54 has a bottom section 56 and two side wall sections 58 each having an integral flange 60 for connecting the support member to the rear wall of the hatcher. Each side wall 58 has a rectangular cut-out 62 and two rollers 64 in vertical alignment mounted at the top and bottom edges of the cut out area to form an automatic alignment guide 65 for a mounting stand 66 which holds the heating, humidifying and air circulation elements. As seen in FIG. 2, the exhaust duct 22 is pivotally or rotatably mounted to the support member 54 by a pivot pin (not shown) that passes through the side walls of the support member and the side walls of the exhaust duct. This allows the exhaust duct to be lowered for cleaning.

As shown in FIGS. 2 and 8, a duct extension member 68 is mounted in an opening or vent in the roof of the hatcher. The duct extension member extends into the hatcher chamber and has three sections 70 which attach to the top end of the air intake ducts 24 and air exhaust duct 22 to effectively extend these ducts out of the chamber. The latch mechanism 50 employed to connect the air ducts to the duct extension member is well known in the art.

Figure 4:
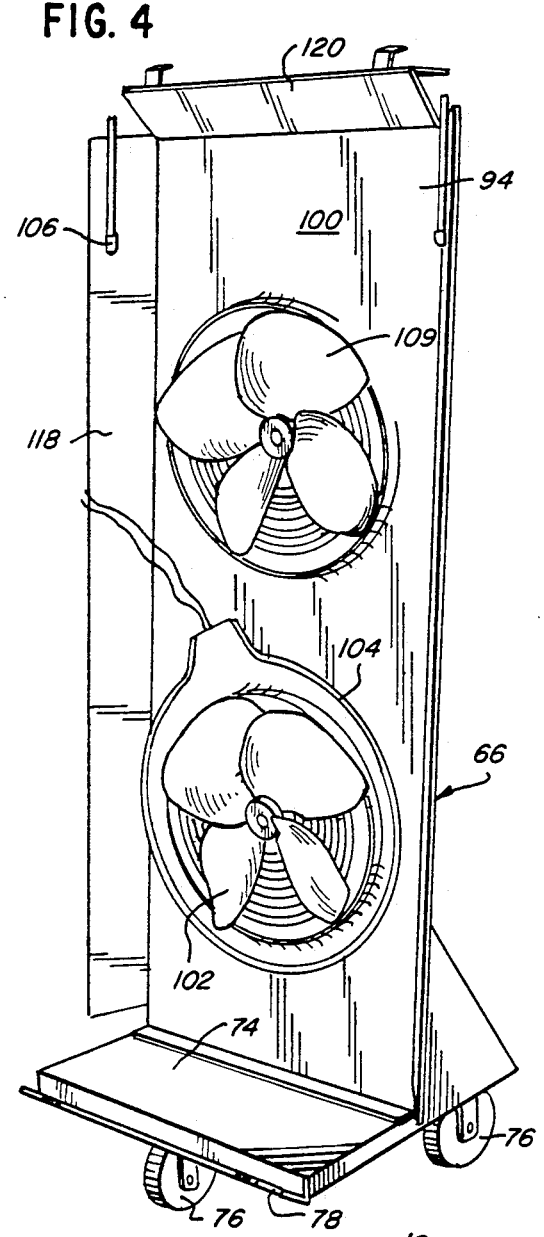
FIG. 4 is a front perspective view of the environmental control elements and mobile stand of this invention.
Figure 5:
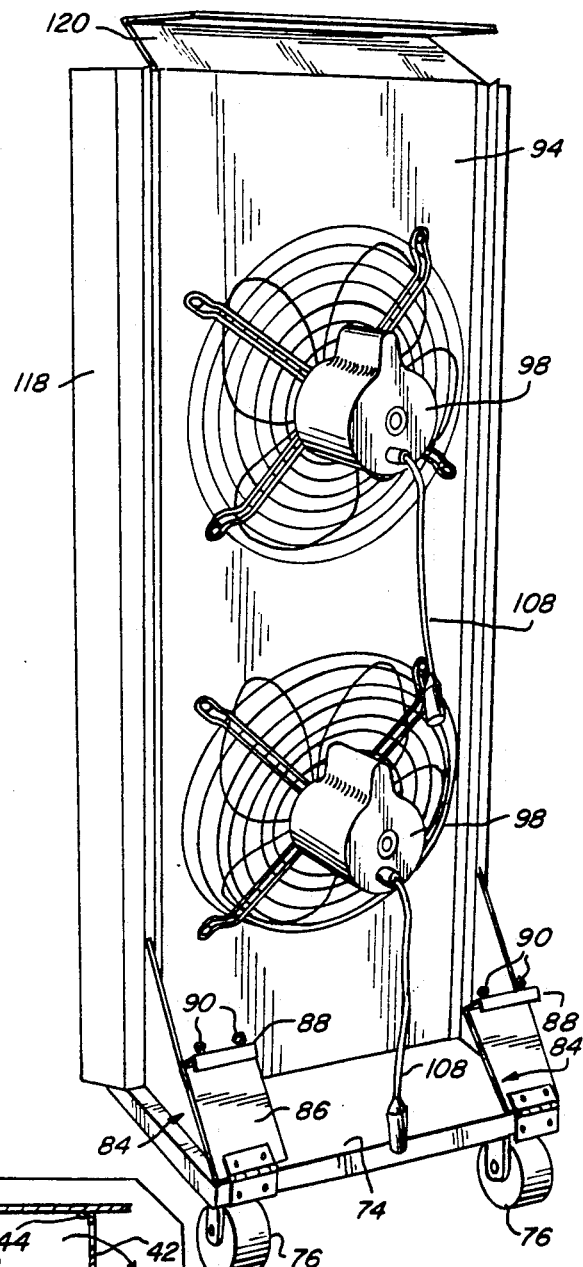
FIG. 5 is a rear perspective view of the environmental control elements and mobile stand of the present invention.
Figure 7:
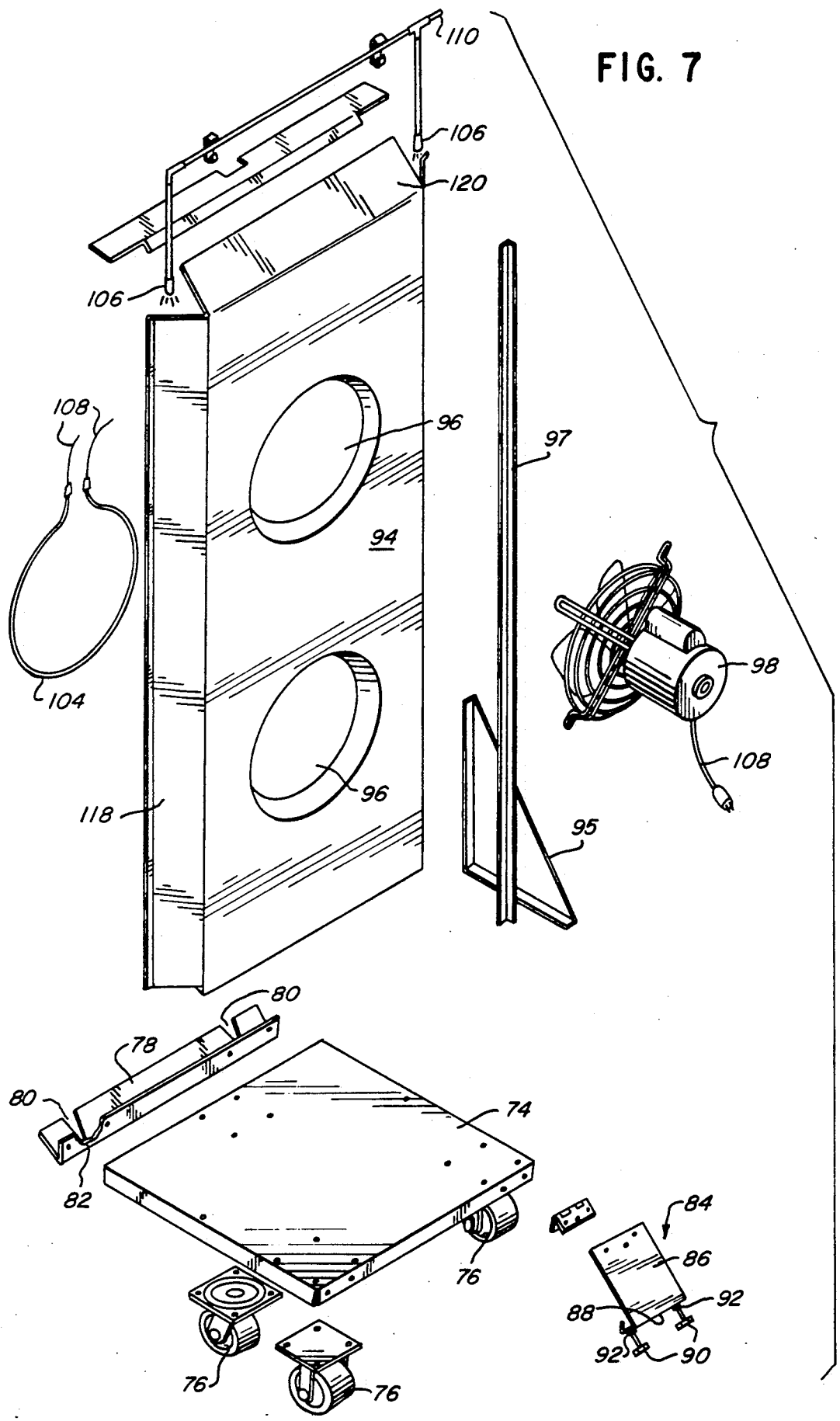
FIG. 7 is an exploded rear perspective view of the environmental control elements and mobile stand in operating position.

To adjust the internal environment of the hatcher chamber, the preferred embodiment of the present invention employs heating, humidifying and air circulation elements mounted on a mobile frame or stand 66 (FIGS. 4, 5 and 7). The mounting stand 66 has a base member or platform 74 which rests upon three rollers or casters 76. The front or lead edge of the base is provided with an upwardly sloped front angle guide 78 which cooperates with the automatic alignment guide 65 of the support member 54 to accurately align the mounting stand 66 and, consequently, the heating, humidifying and air circulating elements, with the air intake and exhaust ducts. In particular, it is critical to insure that the air circulation elements are aligned with the openings 28 in the front wall of the exhaust duct. Improper alignment decreases the overall efficiency of the hatcher.

As seen in FIG. 7, the leading edge of the angle guide 78 is provided with two notches 80 spaced apart a distance equal to the space between the vertical sides 58 of the support member. These notches cooperate with and encompass the side walls 58 of the support member 54 to provide the proper right-left positioning of the mounting stand 66. The back edge 82 of the notches provide a stop for positioning the stand in proper front-back position. The pair of bottom rollers 64 engage the front angle guide 78 and lift the front of the base 66 off the hatcher floor and into its properly aligned position. The front angle guide then slips behind the top pair of rollers to secure the mounting frame in position. As seen in FIG. 1, the rollers secure the base 74 in position and, being made of synthetic rubber, assist in cushioning the stand against vibration when the air circulation elements are in operation.

The frame or base is further provided with a pair of kick stands 84 hinged to the trailing edge. Each kick stand is comprised of a leg portion 86 and a base portion 88 and are placed in position by lifting the back rollers off the hatcher floor and rotating the kick stands to place the base portions 88 against the floor and beneath the rollers and the leg portions 86 against the rollers. The base portions of the kick stand are further provided with levelling screws 90 and lock nuts 92 to level the frame in an aligned position. This action need only be done once upon initial installation. In subsequent operations, the stand will be in the same position due to the automatic alignment feature of the invention.

In the preferred embodiment, the mounting stand 66 has a vertical portion 94 which extends upwardly from the base portion 74 and, as seen in FIGS. 4 and 5, which supports the heating, humidifying and air circulation elements. The vertical portion 94 is supported in an upright position on the base portion 74 by two pairs of support brackets 95 and 97 (one pair shown in FIG. 7) and is provided with two circular cutouts 96 into which the fans 98 are mounted. The air circulation elements of the preferred embodiment are typical single speed rotary fans. On the forward face 100 of the vertical portion and surrounding the fan blade 102 of one fan is a heating element 104 to provide the necessary heating of air as it is circulated throughout the chamber by the fans 98. As can also be seen in FIGS. 4 and 7, spray nozzles 106 are disposed on the front surface of the vertical portion to provide moisture to the circulating air as needed. Appropriate electrical connections 108 and water connections 110 are provided to the heating elements, humidifying elements and fans through the roof of the chamber (FIG. 8).

A microprocessor 112, mounted on the roof in the preferred embodiment, monitors the heat and moisture levels in the hatcher chamber by means of probes mounted within the chamber and adjusts the exhaust openings, heaters, and humidifying elements appropriately based upon feedback from these probes. In particular, if the moisture levels are low, the microprocessor 112 activates a solenoid 114 which opens a valve between the spray nozzles and a water supply W. Similarly, the microprocessor 112 can activate and deactivate the electrical heating elements. With respect to the damper openings 28, as the temperature rises, the microprocessor activates the damper drive motor 38 via electrical connection 116 and the dampers are slowly opened to thereby exhaust a greater amount of internal air. Conversely, as the temperature decreases, the dampers are slowly closed to prevent the warmer internal air from exiting.

The vertical portion 94 of the mounting stand 66 is further provided with a pair of outwardly diverging side walls 118 and an outwardly and upwardly diverging top wall 120 (FIGS. 4 and 5). In the preferred embodiment, when the mounting frame is properly positioned in the chamber, the front face 100 of the vertical portion will be approximately 6 inches from the front wall 26 of the air exhaust duct and the center of the fans will be positioned directly opposite the exhaust openings in the front wall of the exhaust duct. A small gap, approximately 3 inches, will exist between the leading edges of the diverging side walls 118 and the front wall of the air intake ducts 46. The placement of the mounting stand in this way creates a restricted, high pressure zone of air 122 between the mounting frame and the front walls of the air intake and exhaust ducts (FIG. 1). The diverging walls 118 and 120 of the mounting stand create the restricted area and the constant influx of air into the restricted zone by the fans create a high pressure zone of air because the air is entering the zone faster than it can exit. When the dampers are open the high pressure forces some of the air out of the chamber through the exhaust duct. Thus, by controlling the exhaust opening, the amount of air exhausted is controlled.

In addition, the restricted opening between the mounting stand and the front walls of the air intake exhaust ducts create a venturi assembly when the fans 98 are in operation. The fans draw air from within the chamber and force the air against the front walls of the ducts. The air is deflected outwards and upwards. The venturi effect that is created by the air passing through the restricted openings between front duct walls and the diverging side walls of the mounting stand and along the rear wall of the chamber creates a negative pressure along the side walls 42 of the air intake ducts 24. This creates a positive intake of air which draws external air into the intake vents in the roof of the chamber and ultimately out through the holes 52 in the side walls of the air intake ducts into the hatcher chamber.

As the cooler external air is drawn into the chamber, it thoroughly mixes with the internal air escaping from the restricted area 122 as the two air flows merge along the rear wall 18 of the chamber. The mixed supply of air then circulates around the side walls 16 of the hatcher chamber and is drawn back through and across the hatching eggs under the influence of the fans 98. Temperature and humidity probes (not shown) placed appropriately within the chamber can then accurately measure the levels of heat and humidity in the chamber. In response, the microprocessor 112 controls the opening and closing of the dampers 32 on the exhaust duct 22 as well as the heating and humidifying elements.

When the temperature requirements within the chamber are satisfied by the electric heater 104 as well as the heat generated by the avian embryos, the exhaust dampers 32 will start to open to prevent the chamber from becoming too warm. However, the hatcher chamber is a dynamic environment. As more embryos hatch, more heat is generated and more oxygen is depleted and carbon dioxide produced. To counteract and balance the environmental conditions, the damper openings will be required to open further to allow more internal air to escape and be replaced by cooler external air.

Additional auxiliary cooling systems A are also provided which will open the dampers even farther in an emergency. Should the temperature levels rise to a level which cannot be counteracted by the continuous operation of the damper drive motor 38, pneumatic cylinders 124 and 126 are provided which, when activated by the microprocessor, can cause the damper openings to open a set amount instantaneously. The pneumatic cylinders are regulated by air supplies 128 well known in the art. Thus, when the microprocessor detects a condition which cannot be appropriately balanced by the action of the damper drive motor, the auxiliary cooling system will be activated and the damper openings will be further opened a predetermined amount. This will allow the internal air to be more quickly evacuated and internal temperatures to be stabilized before the eggs are adversely effected.

Figure 10:
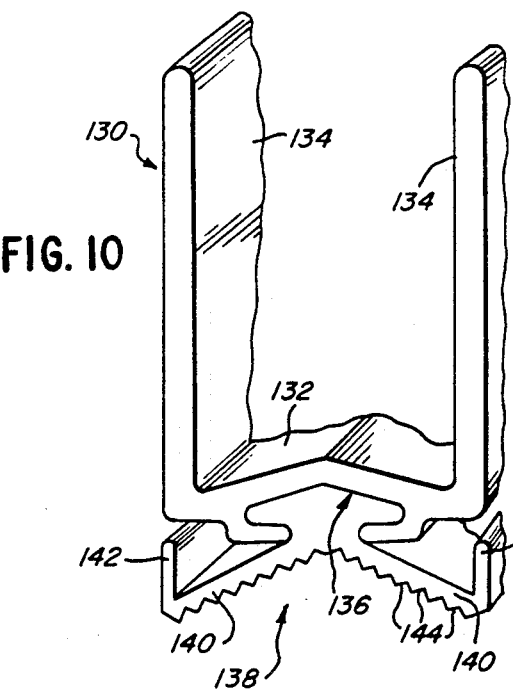
FIG. 10 is an end view of the doorway threshold member of this invention.

A further structure feature found in the present hatcher to promote stable environmental conditions is the threshold assembly 130 shown in FIG. 10. As can be seen, the threshold assembly is a U-shaped member, having a bottom portion 132 and two upstanding side wall portions 134 with a groove 136 provided in the bottom side of the bottom portion of the member. The groove is adapted to accommodate a rubber gasket 138 which is designed to conform to the configuration of the floor where the hatcher is constructed. In most hatchers, the doors are intentionally spaced above the floor so that they may be easily opened and closed without concern for uneven or unlevel floors. Thus, a gap exists underneath each door which can adversely affect the internal environment of the chamber. Various forms of gaskets and seals can be affixed to the individual doors of the chamber, but this requires time and labor to adapt each chamber door to the specific installation site. The present threshold assembly is a freestanding member which abuts a pair of angle irons affixed to the floor of the site.

As seen in FIG. 10, the rubber gasket has two outwardly diverging portions 140 with upwardly turned lips or flanges 142 at the outer end. In addition, the bottom surface of each outwardly diverging portion is provided with ribs 144 which allow the threshold members to form an adequate seal against the hatcher floor. As seen in FIG. 9, one side wall 134 of the threshold member is placed against a mounting bracket 146 and the hatcher door is then shut to abut against the other side wall 134 of the upper U-shaped member. This forms a seal to prevent external air from entering the chamber and affecting the internal environment in an uncontrolled manner. When the cabinet doors are open, the threshold members are moved aside to allow the egg carts ingress and egress into the chamber. The open or U-shaped configuration allows for easy cleaning.

Figure 11:
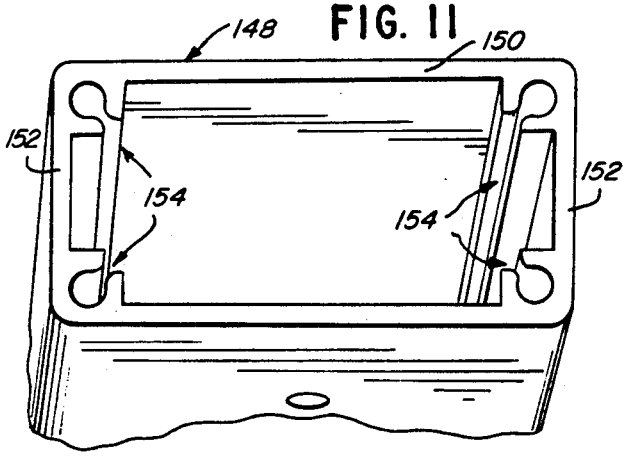
FIG. 11 is a top perspective view of the frame post of this invention.
Figure 12:
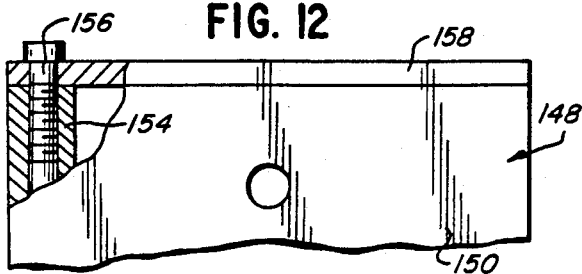
FIG. 12 is a partially broken away side view of the frame post of the present invention with a cap secured in place.

A still further structural improvement of the present invention is the frame post 148 (FIGS. 11, 12). The frame post of the preferred embodiment is rectangular in cross-section and is defined by two spaced side walls 150 and two spaced end walls 152. Formed in each internal corner of the post is a continuous boss 154. The boss receptively engages threaded bolts or screws 156 to facilitate securing a cap 158 to the post end or to facilitate securing one post to another without the need of a separate mounting bracket. As can be seen in FIG. 11, the boss is provided with a continuous groove of slot to allow for threading of the boss when a bolt or screw is engaged. In addition, to promote overall efficiency of the hatcher, the posts can be filled with insulation.

From the above description it is apparent that the objectives of the present invention have been achieved. While only certain embodiments have been set forth, alternative embodiments and various modifications will be apparent from the above description to those skilled in the art. In particular, the air circulation and movement created by the restricted, high pressure air zone can be achieved just as well by modifying or changing any of the component elements. For example, one of ordinary skill in the art will readily appreciate that overall air flow and environmental efficiency can be maintained while modifying or changing the angle or shape of the diverging walls of the mounting frame, the size and shape of the damper openings, the number of fans, fan speed and pitch of the fan blades, the size and shape of the openings in the side walls of the air intake ducts, the number and shape of the intake and exhaust ducts and the overall shape and size of the incubator. These and other alternatives are considered equivalents and within the spirit and scope of the present invention.

What I claim is:

1. An egg hatcher structure comprising a hatching chamber; airflow control means for creating a restricted area high pressure air zone within said chamber to control the flow of external air into the hatching chamber and to control the flow of internal air out of the hatching chamber; environmental adjustment means mounted on a moveable frame with wheels for heating, humidifying and circulating air within said chamber and alignment means for placement and removal of said environmental adjustment means; and environmental adjustment control means for monitoring the temperature, moisture and air circulation levels within the chamber and adjusting the environmental adjustment means and airflow control means to maintain the temperature, moisture and air circulation at prescribed levels.

2. The egg hatcher structure of claim 1 wherein said environmental adjustment means includes air circulation means for circulating air within the hatcher chamber, heating means for heating air circulating within the hatcher chamber, and humidifying means for moisturizing the air circulating within the hatcher chamber.

3. The egg hatcher structure of claim 2 wherein said air circulation means includes at least one fan, said heating means includes at least one electric heating coil disposed adjacent the blades of said fan, and said humidifying means includes at least one spray nozzle operably associated with a supply of water and positioned to discharge a spray of water across the path of air exiting said air circulation means.

4. The egg hatcher structure of claim 1 wherein said chamber has at least a front wall, a rear wall, and a pair of sidewalls, and said airflow control means includes an air exhaust duct vertically disposed along the rear wall of said chamber, said air exhaust duct communicating with the exterior of said chamber and comprising a front wall interconnecting two side walls, said front wall spaced from said rear wall of said chamber and having at least one opening to permit the air inside the chamber to be exhausted out of the chamber, said opening being covered by a damper slidably mounted on the front wall of said exhaust one air intake duct vertically disposed along the rear wall of said hatcher and adjacent said exhaust duct, said air intake duct communicating with the exterior of the chamber and comprising a side wall mounted on said rear wall of said chamber and spaced laterally from one side wall of said exhaust duct and a front wall pivotally connected to said side wall and releasably connectable to said front wall of said exhaust duct, said side wall of said air intake duct having at least one opening to allow external air to enter said hatcher chamber.

5. The egg hatcher structure of claim 4 wherein said alignment means are mounted along the bottom of the rear wall of the chamber for supporting and positioning said exhaust duct and for aligning said environmental adjustment means relative to said airflow control means.

6. The egg hatcher structure of claim 1 wherein said alignment means are mounted along the bottom of the rear wall of the chamber for precisely positioning said environmental adjustment means relative to said airflow control means.

7. The egg hatcher structure of claim 1 wherein said alignment means comprises a mounting bracket having two vertical side walls interconnected by a horizontal bottom portion, said vertical side walls each having a cut out portion and a roller disposed at the bottom and top of said cut out portions to secureably engage said mobile stand.

8. The egg hatcher structure of claim 4 wherein said environmental adjustment control means comprises a microprocessing means operatively connected to temperature and moisture sensors disposed within said hatcher chamber to monitor the temperature and moisture levels within said hatcher chamber and operatively associated with said environmental adjustment means and airflow control means to maintain the temperature, moisture and fresh air levels within said hatcher chamber at prescribed levels by adjusting said environmental adjustment means and airflow control means.

9. The egg hatcher structure of claim 8 wherein said environmental adjustment means includes air circulation means for circulating air within the chamber, heating means operatively associated with and responsive to said microprocessing means and associated with said air circulation means to heat the circulating air, humidifying means operatively associated with an responsive to said microprocessing means to supply moisture to the circulating air, and air exhaust means operatively associated with and responsive to said microprocessing means to control the exhaust of air from the chamber.

10. The egg hatcher of claim 4 wherein said environmental adjustment control means comprises a microprocessing means operatively connected to temperature and moisture sensors disposed within the hatcher chamber to monitor the temperature and moisture levels within said chamber, operatively associated with said environmental adjustment means to maintain the temperature and moisture levels within the hatcher chamber at prescribed levels by adjusting said environmental adjustment means, and operatively associated with said dampers to control the size of said opening in said exhaust duct.

11. In an egg hatcher structure having ceiling panel means, side wall panel means, front end panel means including at least one door, rear end panel means, and joining means for interconnecting the ceiling panel means, the side wall panel means and the front and rear end panel means to form a hatcher chamber, the improvement comprising:

an air intake and exhaust vent disposed in the ceiling of the chamber for permitting the inflow of air into the chamber and for permitting the exit of air from within the chamber, air intake and exhaust control means including a first vertically disposed channel attached to the rear end panel means of the chamber and communicating with said air intake and exhaust vent for controlling the exit of internal air from within said chamber, and at least one other vertically disposed channel disposed adjacent said first channel and communicating with said air intake and exhaust vent for controlling the intake of external air into the chamber, environmental adjustment means disposed within said chamber near said vertically disposed channels for humidifying, heating and circulating air within said chamber, said environmental adjustment means including a mounting stand, a pair of electric fans mounted on said stand, at least one heating element mounted on said stand and positioned between said vertically disposed channel and said fans, and humidifying means positioned between said fans and said vertically disposed channels, said mounting stand cooperating with said vertical channels and said fans to create a restricted area high pressure zone of air to control the exit of air, the intake of air and the mixing of internal and external air.

12. An egg hatcher structure comprising a hatching chamber having at least a front wall, a rear wall and a pair of side walls; an air exhaust duct vertically disposed along said rear wall of said chamber and communicating with the exterior of said chamber for directing and controlling the flow of internal air out of the hatching chamber, said air exhaust duct comprising a front wall interconnecting two side walls, said front wall spaced from said rear wall of said chamber and having at least one opening to permit the air inside the chamber to be exhausted out of the chamber, said opening being covered by a damper slidably mounted on the front wall of said exhaust duct to thereby vary the size of said opening for directing and controlling the flow of internal air out of the hatching chamber, said air intake duct communicating with the exterior of the chamber and comprising a side wall mounted on said rear wall of said chamber and spaced laterally from one side wall of said exhaust duct and a front wall pivotally connected to said side wall and releasably connectable to said front wall of said exhaust duct, said side wall of said air intake duct having at least one opening to allow external air to enter said hatcher chamber; environmental adjustment means for heating, humidifying and circulating air within said chamber; and environmental adjustment control means for monitoring the temperature, moisture and air circulation levels within the chamber and adjusting the environmental adjustment means and said dampers to maintain the temperature, moisture and air circulation at prescribed levels.

13. The egg hatcher structure of claim 12 further comprising alignment means mounted along the bottom of the rear wall of the chamber for supporting and positioning said exhaust duct and for aligning said environmental adjustment means relative to said at least one opening in said front wall of said air exhaust duct.

14. The egg hatcher of claim 12 wherein said environmental adjustment control means comprises a microprocessing means operatively connected to temperature and moisture sensors disposed within the hatcher chamber to monitor the temperature and moisture levels within said chamber, operatively associated with said environmental adjustment means to maintain the temperature and moisture levels within the hatcher chamber at prescribed levels by adjusting said environmental adjustment means, and operatively associated with said dampers to control the size of said opening in said exhaust duct.

15. An egg hatcher structure comprising a hatching chamber having at least a front wall, a rear wall and a pair of side walls; airflow control means for directing and controlling the flow of external air into the hatching chamber and for directing and controlling the flow of internal air out of the hatching chamber; environmental adjustment means for heating, humidifying and circulating air within said chamber; environmental adjustment control means for monitoring the temperature, moisture and air circulation levels within the chamber and adjusting the environmental adjustment means and airflow control means to maintain the temperature, moisture and air circulation at prescribed levels; and alignment means mounted along the bottom of the rear wall of the chamber for precisely positioning said environmental adjustment means relative to said airflow control means, said alignment means including a mounting bracket having two vertical side walls interconnected by a horizontal bottom portion, said vertical side walls each having a cut out portion and a roller disposed at the bottom and top of said cut out portions.

16. An egg hatcher structure comprising a hatching chamber; airflow control means for directing and controlling the flow of external air into the hatching chamber and for directing and controlling the flow of internal air out of the hatching chamber; environmental adjustment means for heating, humidifying and circulating air within said chamber; said environmental adjustment means including air circulation means for circulating air within the hatcher chamber, heating means for heating air circulating within the hatcher chamber, and humidifying means for moisturizing the air circulating within the hatcher chamber; a mobile cart upon which said environmental adjustment means is mounted, said mobile cart movable for placement and removal of said environmental adjustment means from said hatcher chamber, said mobile cart including enclosure means which cooperates with said airflow control means and said air circulation means to create a restricted area high pressure air zone within the chamber for controlling the exhaust of internal air out of the chamber and the intake of external air into the chamber; and, environmental adjustment control means for monitoring the temperature, moisture and air circulation levels within the chamber and adjusting the environmental adjustment means and airflow control means to maintain the temperature, moisture and air circulation at prescribed levels.

* * * * *

UNITED STATES PATENT AND TRADEMARK OFFICE
CERTIFICATE OF CORRECTION

PATENT NO. : 5,005,523
DATED : April 9, 1991
INVENTOR(S) : Matthew R. Foster

It is certified that error appears in the above-identified patent and that said Letters Patent is hereby corrected as shown below:

Column 10, Claim 4, line 65, after "exhaust" insert

--duct to thereby vary the size of said opening, and at least--

Signed and Sealed this

Twenty-fifth Day of August, 1992

Attest:

DOUGLAS B. COMER

Attesting Officer     Acting Commissioner of Patents and Trademarks